(12) United States Patent
Tachiiri et al.

(10) Patent No.: US 12,709,320 B2
(45) Date of Patent: Aug. 18, 2026

(54) STEERING DEVICE

(71) Applicants: DENSO CORPORATION, Kariya-city (JP); TOYOTA JIDOSHA KABUSHIKI KAISHA, Toyota (JP); JTEKT CORPORATION, Kariya (JP)

(72) Inventors: Motoki Tachiiri, Nisshin-city (JP); Yuta Suzuki, Kariya-city (JP); Takashi Suzuki, Kariya-city (JP); Toru Takashima, Susono-shi (JP); Takashi Kodera, Kariya-city (JP)

(73) Assignees: DENSO CORPORATION, Kariya-city (JP); TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 563 days.

(21) Appl. No.: 18/302,658

(22) Filed: Apr. 18, 2023

(65) Prior Publication Data

US 2023/0271644 A1 Aug. 31, 2023

Related U.S. Application Data

(63) Continuation of application No. PCT/JP2021/037895, filed on Oct. 13, 2021.

(30) Foreign Application Priority Data

Oct. 22, 2020 (JP) ................................ 2020-177252

(51) Int. Cl.
*B62D 5/04* (2006.01)
*B62D 6/00* (2006.01)

(52) U.S. Cl.
CPC .......... *B62D 5/0403* (2013.01); *B62D 5/046* (2013.01); *B62D 6/008* (2013.01)

(58) Field of Classification Search
CPC ...... B62D 5/0403; B62D 5/046; B62D 6/008; B62D 5/0463; B62D 6/00; B62D 101/00
See application file for complete search history.

(56) References Cited

U.S. PATENT DOCUMENTS

2020/0130728 A1* 4/2020 Takashima .......... B62D 5/0457

FOREIGN PATENT DOCUMENTS

JP 2004-034870 A 2/2004
JP 2005239031 A * 9/2005

(Continued)

OTHER PUBLICATIONS

Espace translation of JP 2005 239031 A (Year: 2005).*

*Primary Examiner* — Vivek D Koppikar
*Assistant Examiner* — Scott Lawrence Strickler
(74) *Attorney, Agent, or Firm* — Precision Patents, P.C.

(57) ABSTRACT

A steering device turns a tire of a vehicle of a steer-by-wire system in which a steering mechanism and a turning mechanism are mechanically separated from each other and is provided with a turning device including a turning actuator and a turning angle control device. The turning actuator turns tires according to an instructed turning angle. The turning angle control device calculates a turning angle command value corresponding to an inputted steering angle signal and generates a signal driving the turning actuator based on that turning angle command value. The turning angle control device applies limit such that the absolute value of a turning angle velocity becomes equal to or below a turning angle velocity limit value set according to a predetermined parameter.

11 Claims, 13 Drawing Sheets

(56) References Cited

FOREIGN PATENT DOCUMENTS

| | | | |
|---|---|---|---|
| JP | 2007137400 | A | 6/2007 |
| JP | 4068903 | B2 | 3/2008 |
| JP | 2010-280289 | A | 12/2010 |
| JP | 5416442 | A | 2/2014 |
| JP | 5416442 | B2 | 2/2014 |
| JP | 5966684 | B2 | 8/2016 |
| JP | 2019-043391 | A | 3/2019 |

* cited by examiner

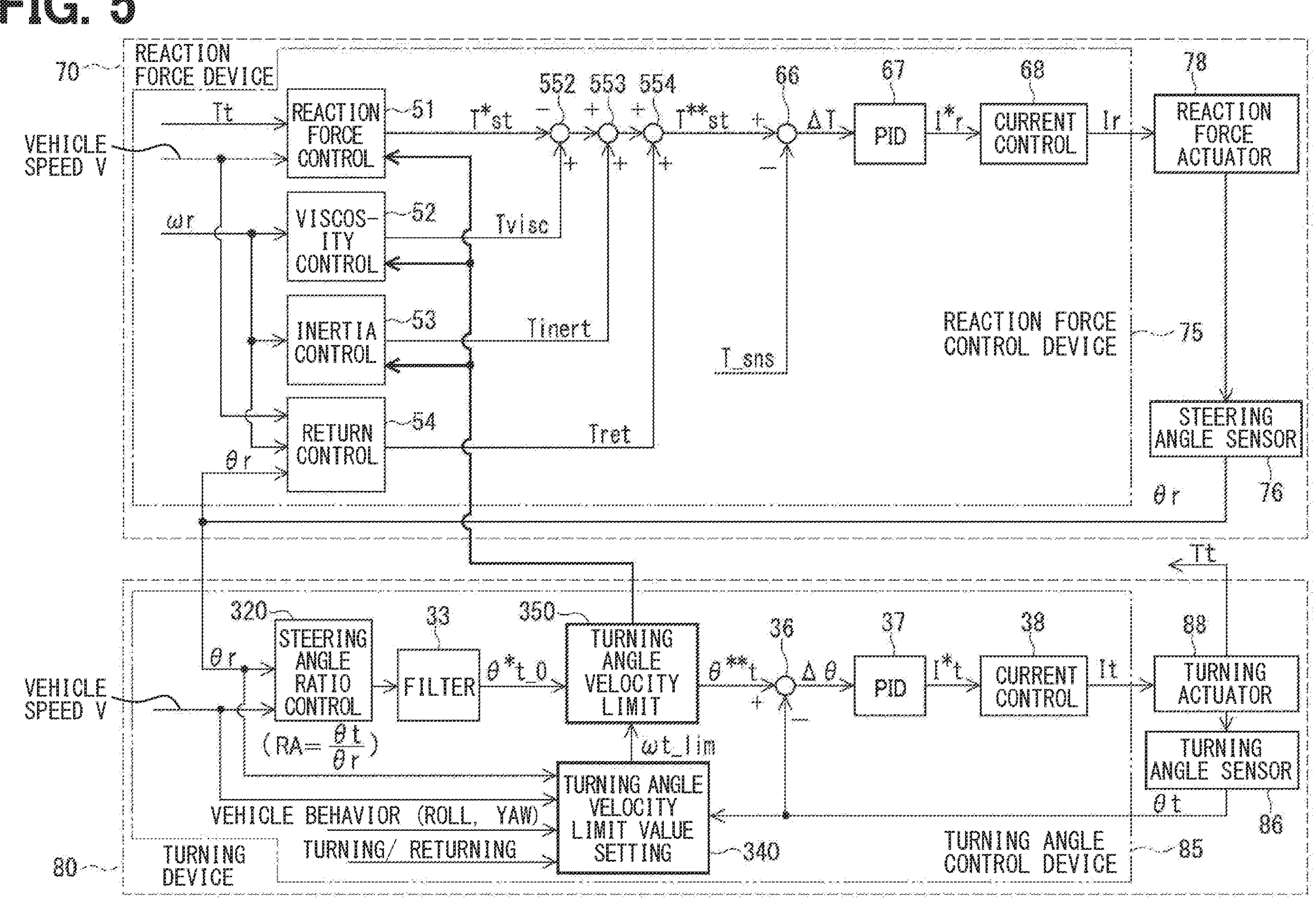
FIG. 5
70
REACTION FORCE DEVICE
VEHICLE SPEED V
Tt
ωr
θr
51
REACTION FORCE CONTROL
52
VISCOSITY CONTROL
53
INERTIA CONTROL
54
RETURN CONTROL
T*st
Tvisc
Tinert
Tret
552
553
554
T**st
66
T_sns
ΔT
67
PID
I*r
68
CURRENT CONTROL
Ir
78
REACTION FORCE ACTUATOR
76
STEERING ANGLE SENSOR
75
REACTION FORCE CONTROL DEVICE
θr
Tt
88
TURNING ACTUATOR
86
TURNING ANGLE SENSOR
θt
85
TURNING ANGLE CONTROL DEVICE
38
CURRENT CONTROL
It
37
PID
I*t
36
Δθ
θ**t
350
TURNING ANGLE VELOCITY LIMIT
ωt_lim
340
TURNING ANGLE VELOCITY LIMIT VALUE SETTING
33
FILTER
θ*t_0
320
STEERING ANGLE RATIO CONTROL
(RA = θt/θr)
VEHICLE BEHAVIOR (ROLL, YAW)
TURNING/ RETURNING
TURNING DEVICE
VEHICLE SPEED V
80

STEERING DEVICE

CROSS REFERENCE TO RELATED APPLICATION

The present application is a continuation application of International Patent Application No. PCT/JP2021/037895 filed on Oct. 13, 2021, which designated the U.S. and claims the benefit of priority from Japanese Patent Application No. 2020-177252 filed on Oct. 22, 2020. The entire disclosures of all of the above applications are incorporated herein by reference.

TECHNICAL FIELD

The present disclosure relates to a steering device.

BACKGROUND

A known vehicle includes a steering mechanism and a turning mechanism that are mechanically connected with each other.

SUMMARY

According to an aspect of the present disclosure, a steering device turns a tire of a vehicle of a steer-by-wire system. In the steer-by-wire system, a steering mechanism and a turning mechanism are mechanically separated from each other.

BRIEF DESCRIPTION OF THE DRAWINGS

The above and other objects, features, and advantages of the present disclosure will be more apparent from the following detailed description with reference to the accompanying drawings, in which:

FIG. 5 is a control block diagram of a reaction force device and a turning device;

DETAILED DESCRIPTION

Figure 1:
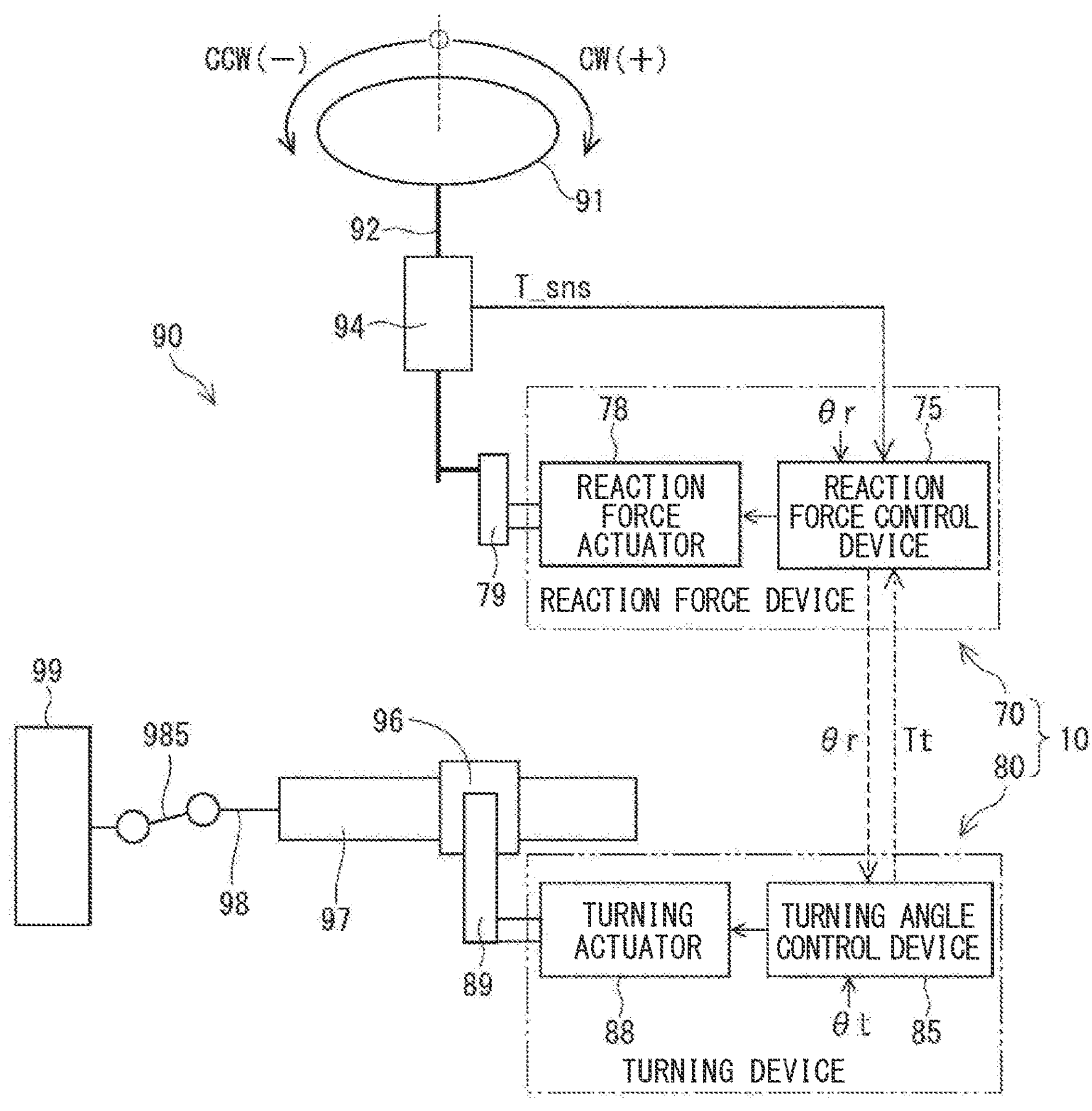
FIG. 1 is an overall schematic diagram of a steer-by-wire system to which a steering device in an embodiment is applied.

Hereinafter, examples of the present disclosure will be described.

According to an example of the present disclosure, a steer-by-wire system includes a steering mechanism and a turning mechanism that are mechanically separated from each other.

In the steer-by-wire system, it is conceivable to generate a turning angle velocity variable. As one example, a turning angle velocity before correction is multiplied by a gain depending on steering angle and vehicle speed to compute an optimum turning angle velocity lower than before correction for optimization of response speed of a turning wheel corresponding to an operating state of a steering wheel.

With a steer-by-wire system, a steering angle ratio that is a ratio of a turning angle to a steering angle can be variably set. However, when at a high steering angle ratio, a steering operation may be performed with the same sensation as at a low steering angle ratio, the tires are turned at a speed beyond imagination. During a turning operation at high steering angle ratio, a vehicle behavior with large roll, yaw, and the like occurs and ride comfort is degraded.

It is notes that, the vehicle of a steer-by-wire system assumed in the present disclosure is not limited to those in which a driver performs driving operation but includes automatic drive vehicles.

According to the present disclosure, a steering device turns a tire of a vehicle of a steer-by-wire system in which a steering mechanism and a turning mechanism are mechanically separated from each other. This steering device, including those applied to an automatic drive vehicle, is provided with, at least, a turning device including a turning actuator and a turning angle control device.

A turning actuator is configured to turn the tire according to an instructed turning angle. A turning angle control device is configured to calculate a turning angle command value, which corresponds to an inputted steering angle signal, and generate a signal to drive the turning actuator based on the turning angle command value. The turning angle control device is configured to apply limit, such that an absolute value of a turning angle velocity becomes equal to or below a turning angle velocity limit value, which is set according to a predetermined parameter.

A steering device applied to a vehicle of a steer-by-wire system in which a driver performs driving operation is further provided with a reaction force device including a reaction force actuator and a reaction force control device. The reaction force actuator imparts reaction force against a driver's steering operation of a steering. The reaction force control device generates a signal driving the reaction force actuator based on a signal from the turning angle control device.

For example, the turning angle control device varies a turning angle velocity limit value according to "a turning angle equivalent value or a steering angle equivalent value, a vehicle behavior, a vehicle speed, a status of turning and returning as "predetermined parameters." "Turning angle equivalent value" or "steering angle equivalent value" cited here may be respectively a turning angle or a steering angle itself or may be any value correlated with a turning angle or a steering angle. Indicated values in automatic operation are also included in this. "Turning or returning" is not limited to a driver's driving operation and is interpreted so as to expand to a change in a steering direction by an indicated value in automatic operation.

In a steer-by-wire system in which tires are turned in proportion to a steering angle, a vehicle behavior (specifically, a roll angle) occurring during steering operation is in proportion to a yaw angle, a yaw rate, and a time change rate of a tire slip angle. In the present disclosure, therefore, by limiting a turning angle velocity, a vehicle behavior during turning operation can be suppressed to improve ride comfort. Especially, a roll can be suppressed during turning operation at a high steering angle ratio.

Embodiment

A description will be given to an embodiment of a steering device with reference to the drawings. This steering device is a device that turns tires of a vehicle of a steer-by-wire system in which a steering mechanism and a turning mechanism are mechanically separated from each other. The embodiment assumes a steering device applied to a vehicle of a steer-by-wire system in which a driver performs driving operation. As described in the section of other embodiments, this steering device may be applied to an automatic drive vehicle.

FIG. 1 shows an overall configuration of a steer-by-wire system 90. In FIG. 1, only a tire 99 on one side is shown and an illustration of a tire on the opposite side is omitted. A steering device 10 includes a reaction force device 70 and a turning device 80.

The reaction force device 70 includes a reaction force actuator 78 and a reaction force control device 75 that generates a signal driving the reaction force actuator 78 and is connected with a steering 91 via a reaction force reduction gear 79 and a steering shaft 92. The steering 91 is a means for inputting a steering angle and a steering wheel is typically used but may be in a shape of steering rod or the like. In the steer-by-wire system 90, a driver cannot directly sense reaction force to steering. Consequently, the reaction force actuator 78 rotates the steering 91 so as to impart reaction force to steering and gives the driver an appropriate steering feeling.

The turning device 80 includes a turning actuator 88 and a turning angle control device 85 that generates a signal driving the turning actuator 88. Rotation of the turning actuator 88 is transmitted from a turning reduction gear 89 to a tire 99 via a pinion gear 96, a rack shaft 97, a tie rod 98, and a knuckle arm 985. Specifically, rotary motion of the pinion gear 96 is converted into linear motion of the rack shaft 97 and the tire 99 is turned by the tie rod 98 provided at both ends of the rack shaft 97 reciprocatively moving the knuckle arm 985.

A torque sensor 94 detects a driver's steering input applied to the steering shaft 92 based on torsional displacement of a torsion bar. A detection value T_sns of the torque sensor 94 is inputted to the reaction force control device 75.

With respect to a steering angle of the steering 91, for example, the CW direction in FIG. 1 is defined as positive and the CCW direction is defined as negative according to a rotation direction relative to a neutral position of the steering 91. The positive or negative of a turning angle of the tire 99 is defined in correspondence thereto. An angular velocity is defined with the same sign as an angle. When a driver turns the steering 91 in the CW direction, a detection value T_sns of the torque sensor 94 is positive.

When the steering 91 is turned in the CW direction with the reaction force device 70, an output torque of the reaction force device 70 is positive as well. When a driver holds the steering 91 while an output torque of the reaction force device 70 is being exerted in the CW direction, it turns out that a torque is applied in the CCW direction; therefore, a detection value T_sns of the torque sensor 94 is negative.

The reaction force control device 75 and the turning angle control device 85 are configured based on a microcomputer and the like and are provided therein with CPU, ROM, RAM, I/O, a bus line connecting these configuration elements, and the like, none of which is illustrated. Each processing by the reaction force control device 75 and the turning angle control device 85 may be software processing by CPU executing a previously stored program or may be hardware processing by a dedicated electronic circuit. The reaction force control device 75 and the turning angle control device 85 communicate information with each other via such a vehicle network as CAN communication or a dedicated communication line.

Figure 2:
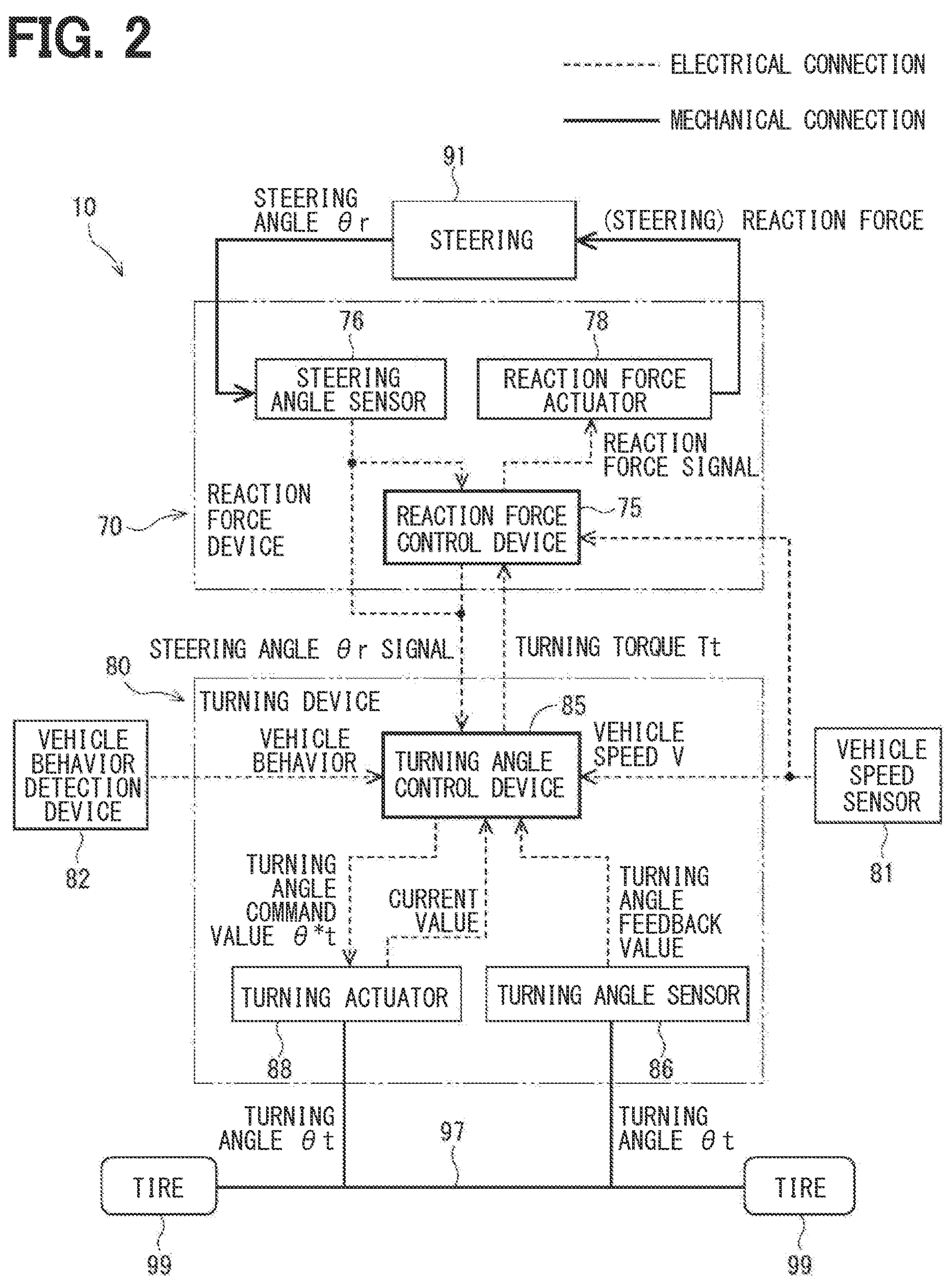
FIG. 2 is a block diagram of a steering device in an embodiment.

A description will be given to a configuration of the steering device 10 in the steer-by-wire system 90 with reference to FIG. 2. The reaction force device 70 includes the reaction force control device 75, a steering angle sensor 76, and the reaction force actuator 78. The steering angle sensor 76 detects a steering angle $\theta r$ inputted from the steering 91. The reaction force control device 75 generates a reaction force signal driving the reaction force actuator 78 based on a signal from the turning angle control device 85. The reaction force actuator 78 imparts reaction force to a driver's steering operation of the steering 91.

The turning device 80 includes the turning angle control device 85, a turning angle sensor 86, and the turning actuator 88. The turning angle control device 85 calculates a turning angle command value $\theta^*t$ corresponding to an inputted steering angle $\theta r$ and generates a signal driving the turning actuator 88 based on that turning angle command value $\theta^*t$. The turning actuator 88 turns tires 99 according to an instructed turning angle. The turning angle $\theta t$ is feedback-controlled using the turning angle sensor 86. A reaction force of the reaction force actuator 78 may be computed by current feedback from the turning actuator 88 in some cases.

The steering device 10 basically freely controls a turning angle $\theta t$ according to a steering angle $\theta r$ and imparts reaction force to the steering 91 using a value of a current generated at the turning actuator 88 during turning or the like. In the present specification, a ratio of a turning angle $\theta t$ to a steering angle $\theta r$ is defined as "steering angle ratio." At a high steering angle ratio, a large turning angle is obtained with a small steering angle. In general, in a low-speed region, a steering angle ratio is increased to reduce an amount of steering and in a high-speed region, a steering angle ratio is reduced for vehicle stability.

In the present embodiment, a vehicle speed V detected by a vehicle speed sensor 81 is inputted to the reaction force control device 75 and the turning angle control device 85. Further, parameters indicating such a vehicle behavior as roll and yaw are inputted from a vehicle behavior detection device 82 to the turning angle control device 85.

A description will be given to the technical background of the present embodiment. As compared with electric power steering systems in which a steering mechanism and a turning mechanism are mechanically coupled with each other, one of advantages of steer-by-wire systems is that a steering angle ratio can be variably set according to the circumstances. At a high steering angle ratio, a vehicle can be turned up to the maximum turning angle with a small steering angle and a driver can drive without changing the hold of the steering 91. As a result, the driver can park a vehicle or make a U-turn with a small steering angle and thus, a steering load is reduced.

Figure 3:
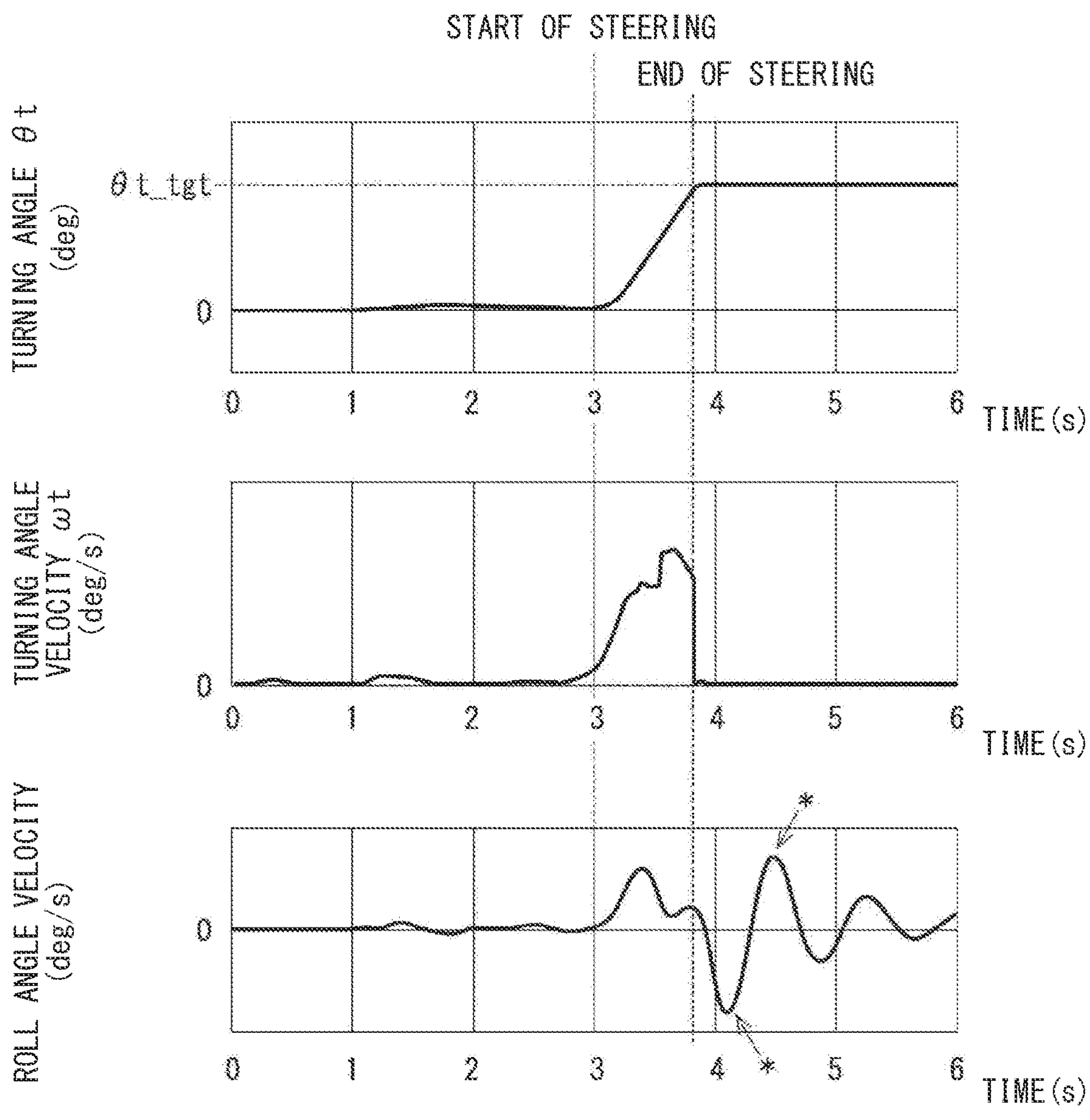
FIG. 3 is time charts indicating an occurrence of a roll during turning operation in a comparative example.
Figure 4:
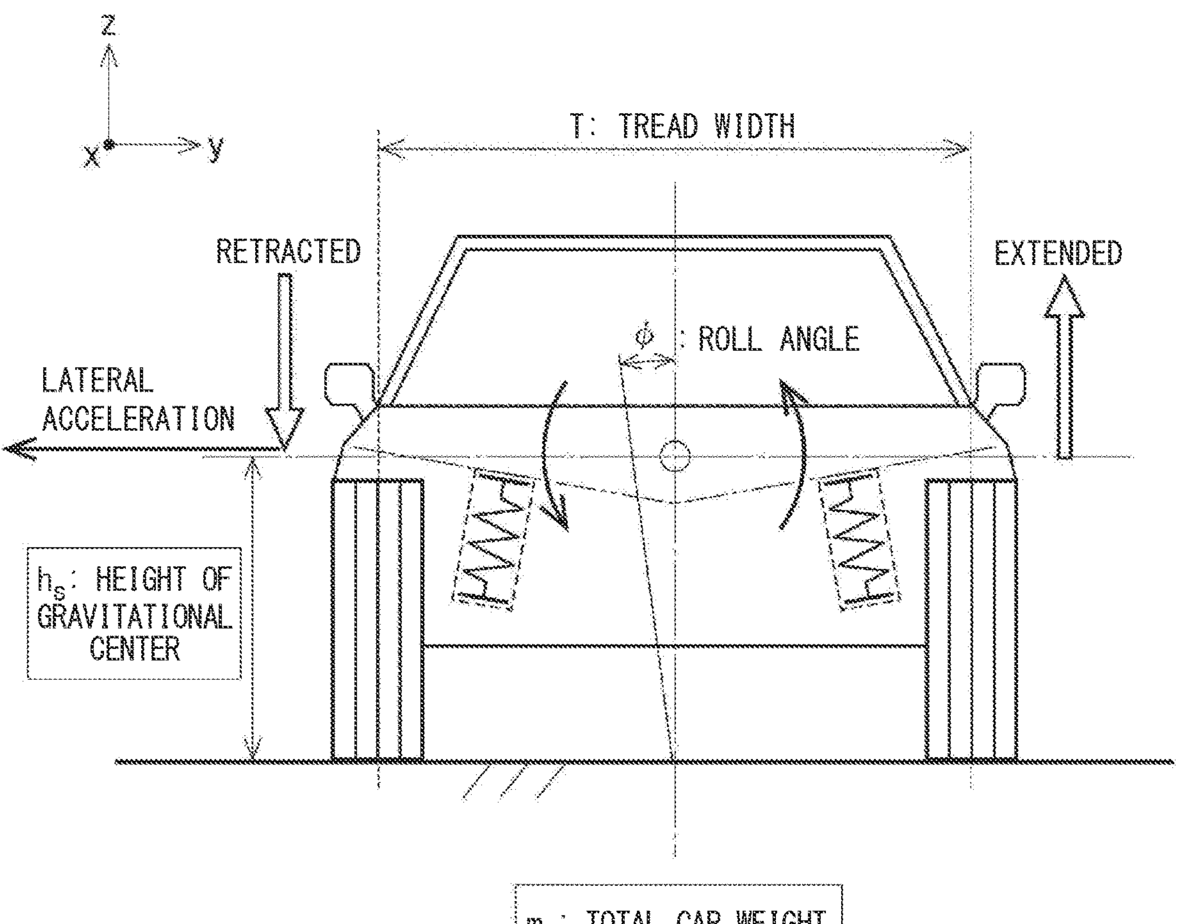
FIG. 4 is a schematic diagram of a front view of a vehicle illustrating relation between roll angle and roll moment.

A description will be given to that a vehicle behavior may become unstable during turning operation at a high steering angle ratio in some cases with reference to FIG. 3 and FIG. 4. FIG. 3 shows time changes in turning angle θt, turning angle velocity ωt, and roll angle velocity observed when steering operation is performed from straight-ahead running to U-turn. On the vertical axes, other numeric values than "0" are omitted and the parenthesized units are indicated only for indicating the dimensions of each amount.

When the time is approximated 3.0 seconds, steering operation is started and when the time is approximated 3.8 seconds, the steering operation is terminated. During this period, a turning angle velocity ωt is increased from 0. After the termination of the steering operation, a large roll occurs in the crosswise direction of the vehicle as indicated by the * mark. As described above, during turning operation at a high steering angle ratio, a problem arises. A vehicle behavior with a large roll, yaw, or the like occurs and ride comfort is degraded.

A description will be given to a roll angle φ produced during a left turn and roll moment at that time with reference to FIG. 4 (Reference: Masato Abe "Automotive Vehicle Dynamics Theory and Application" [Second Edition]). Roll moment is expressed by Formula (1) below. The <1> part on the left side denotes roll stiffness; the <2> part denotes mass eccentricity torque; and the <3> part denotes roll damper. The <4> part on the right side denotes "moment of inertia of roll angle acceleration" and the <5> part denotes "yaw-related moment."

[Ex. 1]

$$\underbrace{(-K_\varphi}_{<1>} + \underbrace{g m_s h_s)\varphi}_{<2>} - \underbrace{C_s\dot{\varphi}}_{<3>} = \underbrace{I\varphi\cdot\ddot{\varphi}}_{<4>} - \underbrace{I_{xz}\dot{r} - m_s h_s V(\dot{\beta} + r)}_{<5>} \tag{1}$$

Kφ: roll stiffness [Nm/rad]
(Kφ=kT+Ks)
k: spring stiffness of suspension
T: tread width
Ks: stiffness of stabilizer
g: gravitational acceleration angle
$m_s$: whole vehicle weight
$h_s$: center of gravity
φ: roll angle
Csφ: roll damper
Iφ: moment of inertia of roll angle acceleration
Ixz: moment of inertia of each shaft, coordinate plane
r: yaw angle
V: vehicle speed
β: tire slip angle Roll is influenced by roll stiffness, roll damper, roll angle acceleration to moment of inertia, yaw angle, yaw rate, and a differential value (that is, time change rate) of tire slip angle.

Here, attention should be paid to "yaw-related moment." At a high steering angle ratio, it is guessed that a degree of increase in turning speed incident to steering speed is increased and yaw angle, yaw rate, and a differential value of tire slip angle have large influence as compared with moment of inertia of roll angle acceleration. In a low-speed region, it is guessed that a yaw angle and a yaw rate are in proportion to a turning angle and a turning angle velocity; therefore, it is assumed that roll is suppressed by limiting a turning angle velocity.

A roll suppression effect is brought about also by adjusting roll stiffness or roll damper instead of yaw angle and yaw rate. JP-5416442B discloses a suspension control device that optimizes response to steering operation from this point of view. However, to vary a parameter of a suspension, four special suspensions are required and increase in cost is incurred. Meanwhile, in a method of limiting a turning angle velocity, control only has to be modified and increase in cost is not incurred.

In the present embodiment, consequently, especially to suppress roll during turning operation at a high steering angle ratio, the turning device 80 is provided with a block that limits a turning angle velocity of the turning actuator 88. A detailed description will be given to a control configuration of the steering device 10 in the embodiment with reference to FIG. 5. "r" is affixed to the symbol of each parameter related to output of the reaction force device 70 and "t" is affixed to the symbol of each parameter related to output of the turning device 80.

It is interpreted that the values of steering angle θr, steering angle velocity ωr, turning angle θr, and like include "equivalent values" obtained by multiplying or dividing a turning angle or an angular velocity of the reaction force actuator 78 or the turning actuator 88 by a reduction gear ratio of the reduction gears 79, 89 or the like as appropriate. It is interpreted that "turning torque Tt" directly refers to an output torque of the turning actuator 88 includes an "equivalent value" of a turning torque command value T*t, a current It passed through the turning actuator 88 or a current command value I*t, or the like.

The reaction force control device 75 of the reaction force device 70 includes a reaction force control unit 51, a viscosity control unit 52, an inertia control unit 53, a return control unit 54, a torque deviation calculation unit 66, a PID controller 67, a current control unit 68, and the like. The reaction force control unit 51 calculates a steering torque command value T*st by increasing or decreasing a turning torque equivalent value Tt depending on a vehicle speed V.

The viscosity control unit 52 calculates a viscosity command value Tvisc substantially in proportion to a steering angle velocity equivalent value ωr. The "viscosity control unit" may be alternatively designated as "friction control unit." The inertia control unit 53 calculates an inertia command value Tinert substantially in proportion to a differential value of a steering angle velocity equivalent value ωr (that is, steering angle acceleration equivalent value). The return control unit 54 calculates a return command value Tret exerted in a direction in which the steering 91 is returned to the neutral position based on a steering angle equivalent value θr, a steering angle velocity equivalent value ωr, and a vehicle speed V.

At adders 552, 553, 554, a viscosity command value Tvisc, an inertia command value Tinert, and a return command value Tret are added to a sign inverted value (−T*st) of a steering torque command value T*st in this order. A value obtained after addition by the adder 554 is outputted as a "target value T**st based on a steering torque command value T*st."

The torque deviation calculation unit 66 calculates a torque deviation ΔT of a target value Tst and a detection value T_sns of the torque sensor 94. The PID controller 67 exercises PID control so as to bring a torque deviation ΔT close to 0, that is, such that a detection value T_sns of the torque sensor 94 follows the target value Tst to compute a current command value *r. The current control unit 68 controls a current Ir passed through the reaction force actuator 78. A steering angle equivalent value θr equivalent to a turning angle of the reaction force actuator 78 is detected by the steering angle sensor 76 and is outputted to the return control unit 54 of the reaction force control device 75 and the turning angle control device 85.

The turning angle control device 85 of the turning device 80 includes a steering angle ratio control unit 320, a filter 33, a turning angle velocity limit value setting unit 340, a turning angle velocity limiting unit 350, an angle deviation calculation unit 36, a PID controller 37, a current control unit 38, and the like.

The steering angle ratio control unit 320 computes a steering angle ratio RA that is a ratio of a turning angle θt to a steering angle θr based on a steering angle equivalent value θr and a vehicle speed V and multiplies the steering angle θr by the steering angle ratio RA to calculate a turning angle command value θ*t_0 before limit. A concrete example of steering angle ratio control will be described later with reference to FIG. 10 and FIG. 11. A turning angle command value θ*t_0 before limit is processed by a notch filter avoiding resonance or a filter 33 comprised of LPF or the like avoiding steep input.

The turning angle velocity limit value setting unit 340 varies a turning angle velocity limit value ωt_lim according to predetermined parameters. The "predetermined parameters" include a steering angle equivalent value θr or a turning angle equivalent value θt, a vehicle speed V, such a vehicle behavior as yaw and roll, and a status of turning and returning. A concrete example of a turning angle velocity limit value ωt_lim being varied according to each parameter will be described later with reference to FIG. 6 to FIG. 8. Though an illustration of an example of vehicle behavior induction is omitted, real-time control can be exercised by varying a limit value ωt_lim according to a parameter of vehicle behavior.

The turning angle velocity limiting unit 350 limits a turning angle velocity such that the absolute value of the turning angle velocity becomes equal to a turning angle velocity limit value ωt_lim or below. A concrete example of turning angle command value limit by turning angle velocity limit will be described later with reference to FIG. 9. When turning angle velocity limit is applied, as indicated by the bold arrow, a constant of the reaction force control device 75 may be switched such that reaction force imparted to the reaction force actuator 78 is increased. As a result, a driver can physically suppress steering speed.

Specifically, at the reaction force control unit 51, a constant of reaction force control in proportion to a turning torque equivalent value Tt is switched such that when turning angle velocity limit is applied, reaction force is increased. Or, at the viscosity control unit 52 and the inertia control unit 53, constants of friction control and inertia control basically for building a steering feeling are switched such that when turning angle velocity limit is applied, reaction force is increased. Alternatively, constants may be matched such that reaction force is increased.

The turning angle deviation calculation unit 36 calculates an angle deviation Δθt of a turning angle command value θ*t and a turning angle feedback value θt. The PID controller 37 exercises PID control so as to bring an angle deviation Δθt close to 0 and computes a current command value I*t. The current control unit 38 controls a current It passed through the turning actuator 88. A turning angle equivalent value θt equivalent to a turning angle of the turning actuator 88 is detected by the turning angle sensor 86 and fed back to the turning angle deviation calculation unit 36. A turning torque equivalent value Tt is outputted to the reaction force control device 75.

Subsequently, a description will be given to examples of control by each block with reference to FIG. 6 to FIG. 11. With respect to each drawing, a description will be given on assumption that input/output characteristics for parameters are based on a "map" for the sake of convenience but may be based on mathematical calculation.

First, consideration will be given to examples of configurations of the turning angle velocity limit value setting unit 340 with reference to FIG. 6 to FIG. 8. The turning angle velocity limit value setting unit 340 in the example shown in FIG. 6 defines a turning angle velocity limit value ωt_lim relative to the absolute value of a turning angle θt by a steering angle induction map 341. For example, in a region where the absolute value of a turning angle θt is θα or below, a limit value ωt_lim is set to a relatively high value ωtH and in a region where the absolute value of a turning angle θt is θβ (>θα) or above, a limit value ωt_lim is set to a relatively low value ωtL. In a region where the absolute value of a turning angle θt is between θα and θβ, a limit value ωt_lim is gradually decreased from the high value ωtH to the low value ωtL. As a result, when the absolute value of a turning angle θt is larger than some value, turning with an angular velocity higher than the limit value ωt_lim is prevented.

An input to the steering angle induction map 341 may be a turning angle detection value θt detected by the turning angle sensor 86 or may be a turning angle command value θ*t or any other "turning angle equivalent value." Alternatively, a steering angle θr or a "steering angle equivalent value" before multiplication by a steering angle ratio RA may be taken as an input. Hereafter, every part related to steering angle induction will be similarly interpreted.

By varying a turning angle velocity limit value ωt_lim according to a turning angle equivalent value or a steering angle equivalent value, turning operation can be performed swiftly in a small steering angle range and gently in a large steering angle range. For this reason, influence on a yaw in a small steering angle range where a roll behavior is less prone to occur can be reduced. In the steering angle induction map 341 shown in FIG. 6, two-staged values ωtH, ωtL are taken as a basis and a limit value ωt_lim is linearly varied according to a steering angle. Instead, three or more-staged values may be taken as a basis or a limit value ωt_lim may be curvedly varied according to a steering angle.

Figure 6:
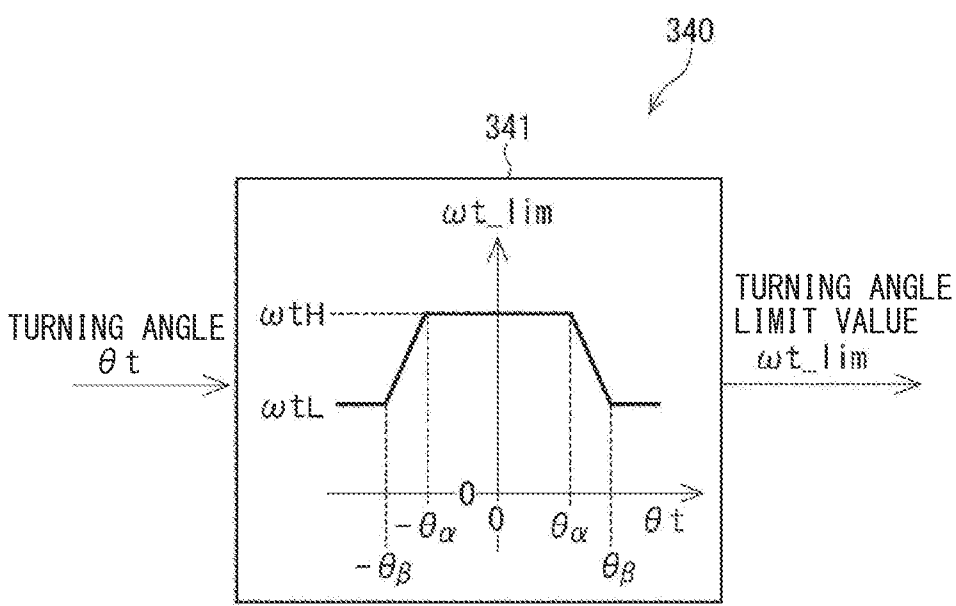
FIG. 6 is a block diagram showing an example of setting of a steering angle induced turning angle velocity limit value.
Figure 7:
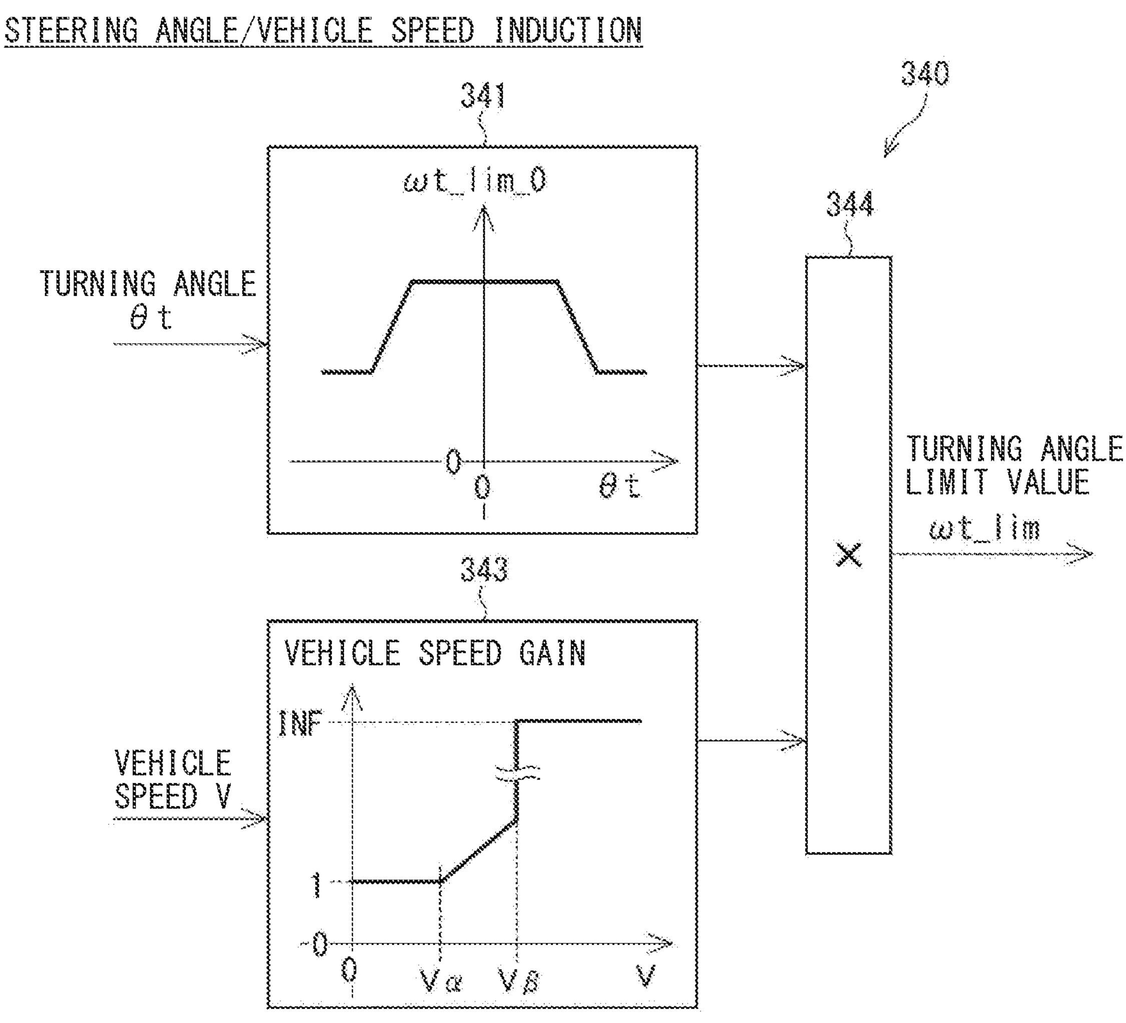
FIG. 7 is a block diagram showing an example of setting of a steering angle and a vehicle speed induced turning angle velocity limit value.

In the example shown in FIG. 7, a vehicle speed gain map 343 is used in addition to the same steering angle induction map 341 as in FIG. 6. For example, a vehicle speed gain is 1 in a region equal to vehicle speed Vα or below, is gradually increased from 1 in a region between vehicle speed Vα to vehicle speed Vβ, and is set to INF, a value sufficiently larger than 1, in a region equal to vehicle speed Vβ or above. A multiplier 344 multiplies a temporary limit value ωt_lim_0 calculated by the steering angle induction map 341 by a vehicle speed gain to calculate a turning angle velocity limit value ωt_lim. When a vehicle speed gain is a sufficiently large value INF, it is equivalent to that turning angle velocity limit is not subsequently applied.

In a region where a vehicle speed V is high, a steering angle ratio is essentially small; therefore, a delay in turning is increased by additionally applying turning angle velocity limit. Since in a high-speed region, turning operation is not largely performed, turning angle velocity limit is unnecessary. With such a configuration as shown in FIG. 7, consequently, a turning angle velocity ωt is limited in a low-speed region and a turning angle velocity ωt is not limited in a high-speed region. As a result, rapid turning operation can be performed in a high-speed region.

Figure 8:
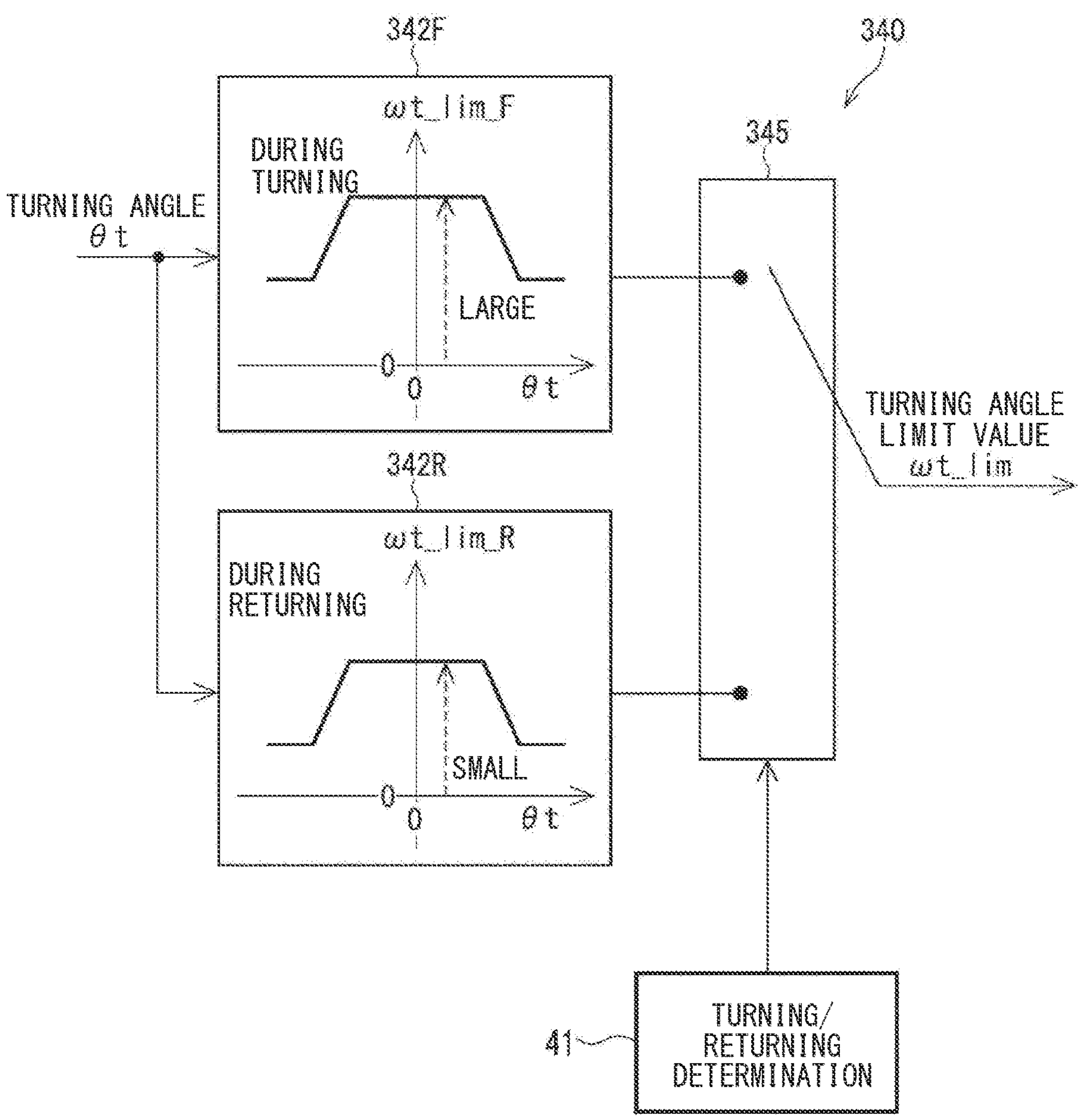
FIG. 8 is a block diagram showing an example of setting of a turning angle velocity limit value based on turning and returning determination.

The turning angle velocity limit value setting unit 340 in the example shown in FIG. 8 includes steering angle induction maps 342F, 342R for turning and returning, different in steering angle induction characteristics from each other, and a switching device 345 and varies a turning angle velocity limit value ωt_lim according to a status of turning and returning. A limit value ωt_lim_R of the steering angle induction map 342R for returning is set to a smaller value than a limit value ωt_lim_F of the steering angle induction map 342F for turning. During turning, energy is accumulated in a spring of a suspension and a vehicle body is prone to more sway during returning than during turning. Therefore, a more stable vehicle behavior is implemented by making a limit value ωt_lim_R for returning smaller than a limit value ωt_lim_F for turning.

The switching device 345 selects either a limit value ωt_lim_F for turning or a limit value ωt_lim_R for returning according to a signal from the turning/returning determination unit 41. For example, the following three methods are present for determining turning and returning: A first method is determination from the signs of a steering angle θr and a steering angle velocity ωr. A second method is determination from the signs of a steering angle velocity ωr and a steering torque in turning and returning during turning (that is, during steering). These methods are used also in electric power steering systems in common.

The third is a method specific to steer-by-wire systems and in this method, attention is paid to "a difference between a reaction force torque Tr outputted from the reaction force actuator 78 and a detection value T_sns of the torque sensor 94" caused by a loss torque of a gear of the reduction gear 79. When the steering 91 is turned by a driver, the absolute value of a detection value T_sns of the torque sensor 94 is larger than the absolute value of a reaction force torque Tr. When the steering 91 is returned by the reaction force actuator 78, meanwhile, the absolute value of a detection value T_sns of the torque sensor 94 is smaller than the absolute value of a reaction force torque Tr.

Figure 9:
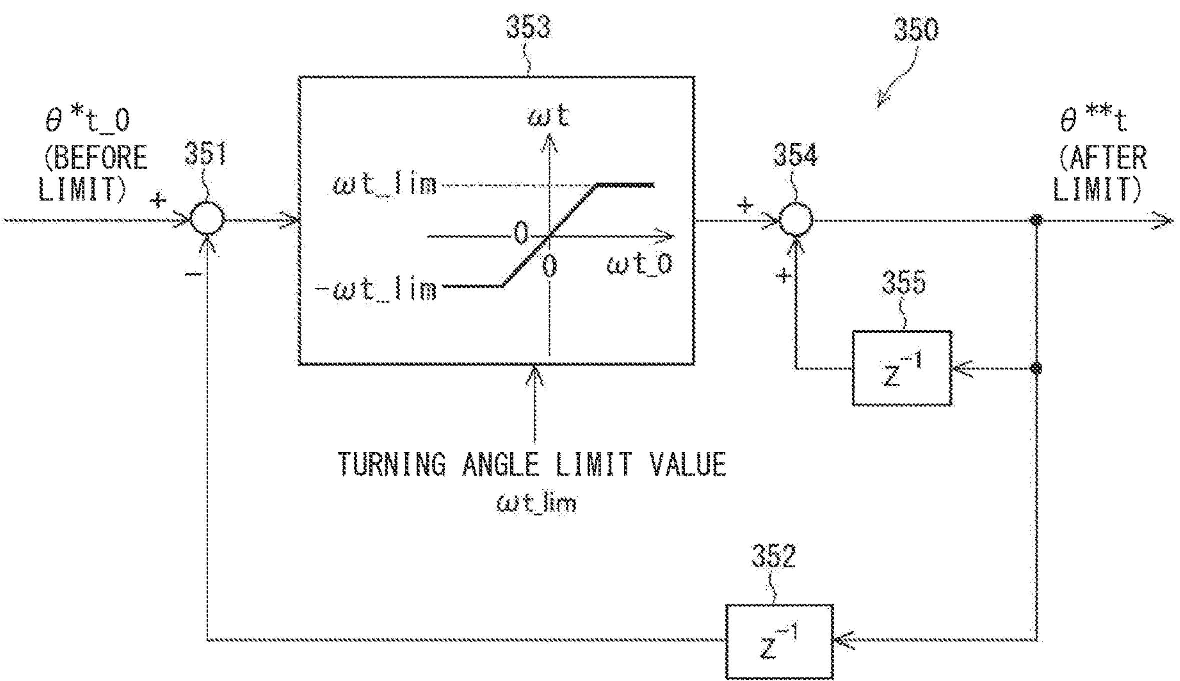
FIG. 9 is a block diagram showing an example of a configuration of a turning angle command value limit.

Subsequently, a description will be given to an example of a configuration of the turning angle command value limiting unit 350 with reference to FIG. 9. Delay elements 352, 355 respectively output the previous value of a turning angle command value θt after limit to an angular velocity calculator 351 and an adder 354. The angular velocity calculator 351** calculates a turning angle velocity ωt_0 before limit from a difference between a turning angle command value θ*t_0 before limit and the previous value of a turning angle command value θt after limit. An absolute value guard map 353** guards the absolute value of a turning angle velocity ωt to a turning angle velocity limit value ωt_lim.

The adder 354 adds a turning angle velocity ωt after limit to the previous value of a turning angle command value θt after limit and outputs the current value of the turning angle command value θt after limit. A filter may be inserted into a current value output unit to make a change gentle. To mitigate a feeling of wrongness in steering operation in conjunction of turning angle velocity limit, a turning angle velocity limit value ωt_lim may be varied according to a duration for which limit is applied or a steering torque.

A description will be given to an example of a configuration of steering angle ratio control with reference to FIG. 10 and FIG. 11. The turning angle control device 85 is also capable of limiting a turning angle velocity ωt by varying a steering angle ratio RA according to a steering angle θr. In this case, also with respect to input of steering angle induction, whichever of a steering angle equivalent value or a turning angle equivalent value may be used.

Figure 10:
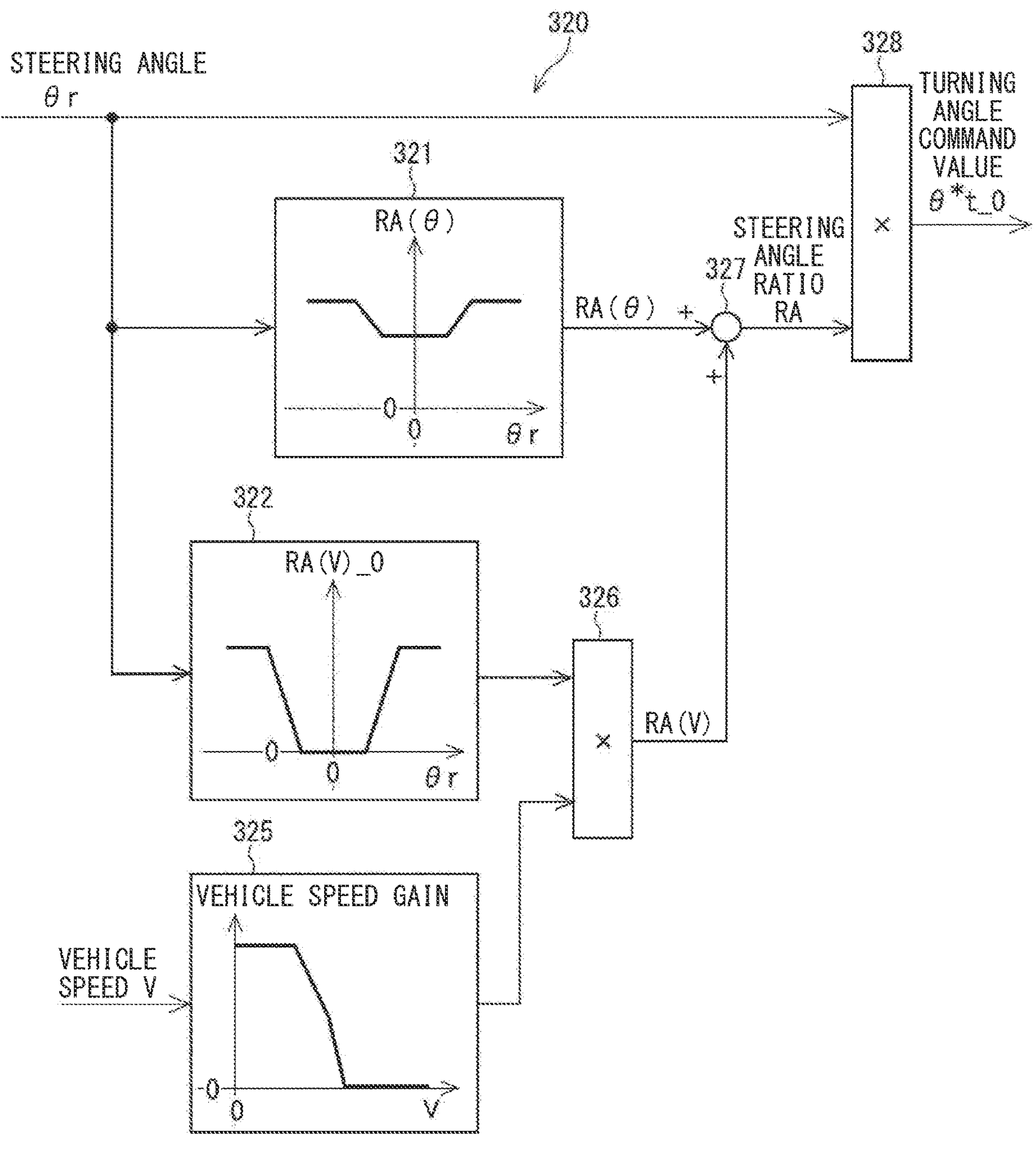
FIG. 10 is a block diagram illustrating Example 1 of steering angle and vehicle speed induced steering angle ratio control.

The steering angle ratio control unit 320 in Example 1 of steering angle ratio control shown in FIG. 10 includes steering angle induction maps 321, 322, a vehicle speed gain map 325, a multiplier 326, an adder 327, and a multiplier 328. The steering angle induction map 321 calculates a steering angle induction term RA (θ) corresponding to the absolute value of a steering angle θr. The steering angle induction map 322 calculates a reference value RA (V)_0 of a vehicle speed induction term corresponding to the absolute value of a steering angle θr. Like the map 343 in FIG. 7, the vehicle speed gain map 325 calculates a vehicle speed gain corresponding to a vehicle speed V. The multiplier 326 multiplies a reference value RA (V)_0 of a vehicle speed induction term by a vehicle speed gain to calculate a vehicle speed induction term RA (V).

The adder 327 adds a steering angle induction term RA (θ) and a vehicle speed induction term RA (V) to calculate a steering angle ratio RA. The multiplier 328 multiplies a steering angle θr by a steering angle ratio RA to calculate a turning angle command value θ*t_0 before limit.

In Example 1 of steering angle ratio control, a steering angle ratio RA is set small in proximity to the neutral position where the absolute value of a steering angle θr is 0 and a steering angle ratio RA is set large in a region where the absolute value of a steering angle θr is large. In this case, a turning angle velocity ωt is increased in the latter half of turning operation; therefore, turning angle velocity limit at the turning angle velocity limiting unit 350 is separately required.

Figure 11:
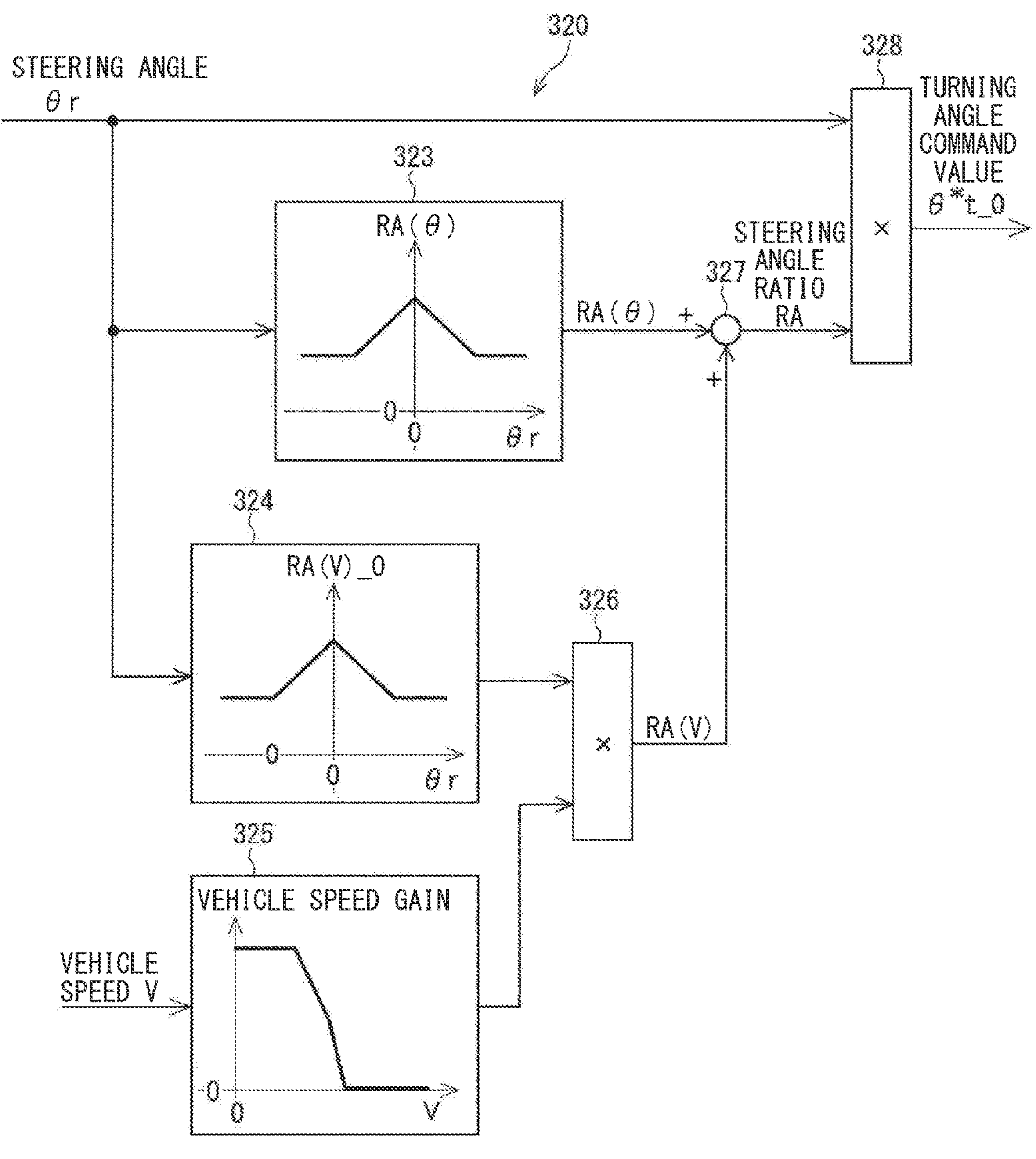
FIG. 11 is a block diagram illustrating Example 2 of steering angle and vehicle speed induced steering angle ratio control.

The steering angle ratio control unit 320 in Example 2 of steering angle ratio control shown in FIG. 11 is different from the configuration in FIG. 10 only in the characteristics of the steering angle induction maps 323, 324 and is identical in the other respects. In Example 2 of steering angle ratio control, contrary to Example 1 of steering angle ratio control, a steering angle ratio RA is set larger in proximity to the neutral position and a steering angle ratio RA is set small in a region where the absolute value of a steering angle θr is large. In this case, a turning angle velocity ωt is reduced in the latter half of turning operation; therefore, necessity for turning angle velocity limit at the turning angle velocity limiting unit 350 can be obviated. However, stability is degraded during straight-ahead running.

Effects

Figure 12:
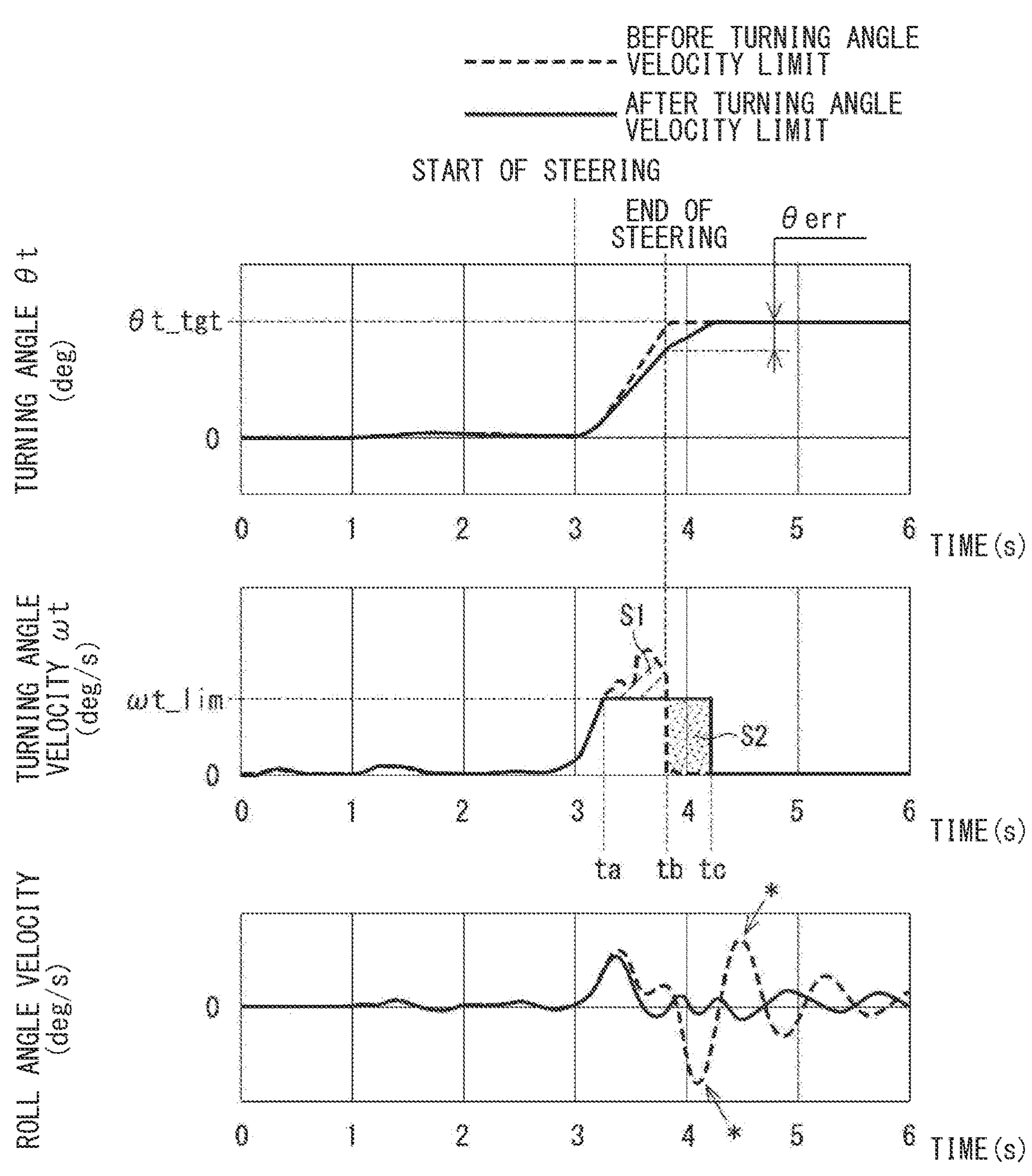
FIG. 12 is time charts illustrating a roll suppression effect due to turning angle velocity limit.

According to the present embodiment, as described up to this point, by limiting a turning angle velocity ωt, a vehicle behavior can be suppressed during turning operation and ride comfort can be improved. A roll can be suppressed especially during turning operation at a high steering angle ratio. FIG. 12 shows a result of a simulation analysis about an influence of roll angle velocity produced by limiting a turning angle velocity ωt. In FIG. 12, the broken lines are waveforms before turning angle velocity limit shown in FIG. 3 and the solid lines are waveforms after turning angle velocity limit.

At time of to after start of steering, a turning angle velocity ωt arrives at a turning angle velocity limit value ωt_lim and application of limit is started. At time of tb, the steering is terminated but a turning angle θt has not arrived at a target value θt_tgt; therefore, output of the turning angle velocity ωt is extended and continued till time of tc. At this time, an integration value S1 of the turning angle velocity ωt reduced by the limit from time of ta to time of tb and an integration value S2 of the turning angle velocity ωt added by the extension from time of tb to time of tc are equal to each other. As a result, at time of tc, a turning angle θt arrives at the target value θt_tgt. A rate of roll produced in the vehicle, occurring in the *-marked parts in the waveform before limit, is reduced by thus limiting a turning angle velocity ωt.

As the result of application of turning angle velocity limit, an angle error can be produced between an expected turning angle in proportion to a primary steering angle θr and an actual turning angle θt and a larger angular deviation can be produced between the neutral position and the end. In the example shown in FIG. 12, to compensate an angle error θerr produced at time of tb, steering is further continued till time of tc after a driver's termination of steering operation. As a result, the driver can be given a feeling of wrongness.

Figure 13:
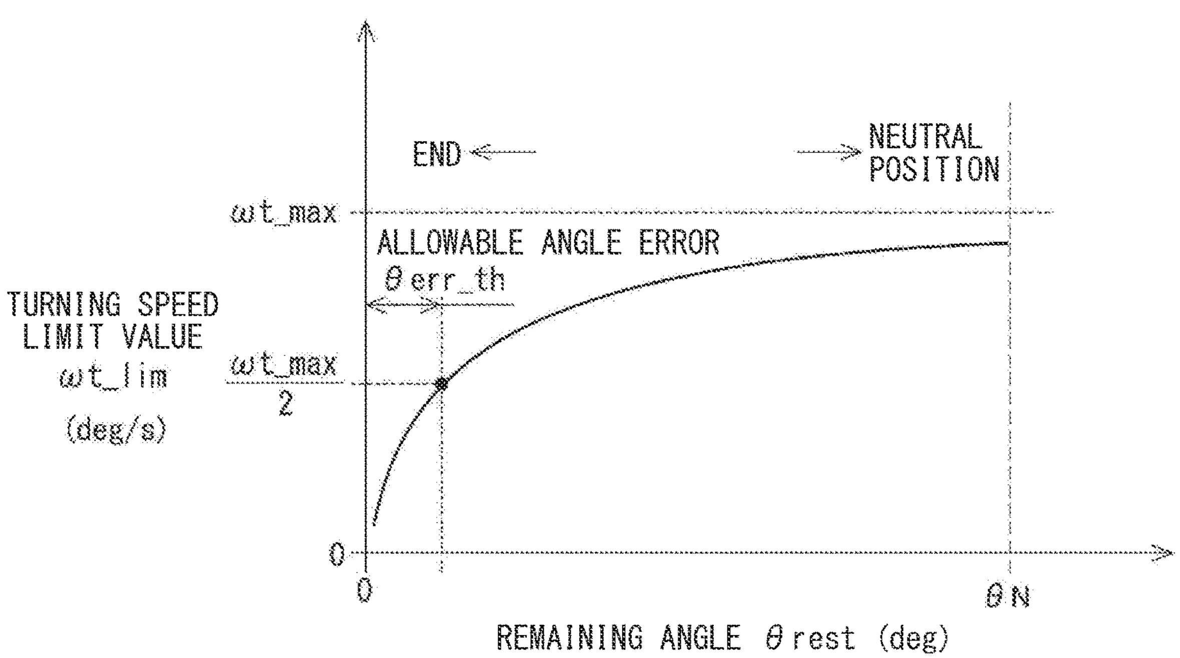
FIG. 13 is a drawing showing relation between a remaining angle to an end and a turning angle velocity limit value in a working example in which an angle error is reduced to an allowable angle error or less by turning angle velocity limit.

Consequently, a description will be given to a working example with reference to FIG. 13. In the working example, turning angle velocity limit is applied such that an angle error θerr caused by turning angle velocity limit becomes equal to a predetermined allowable angle error θerr_th or below. The horizontal axis of FIG. 13 indicates a "remaining angle θrest" that is the absolute value of a difference between a present turning angle θt or steering angle θr and a critical angle at a corresponding mechanical end. In association with steering, a remaining angle θrest is reduced from the maximum value θN at the neutral position to the value 0 at the end. On the vertical axis of FIG. 13, a turning angle velocity assumed maximum value ωt_max is a turning angle velocity equivalent to the assumed maximum value of a driver's operating speed.

The turning angle control device 85 reduces a turning angle velocity limit value ωt_lim with reduction in remaining angle θrest according to a remaining angle θrest such that an angle error θerr from the neutral position to the end is constant at an allowable angle error θerr_th. Relation between remaining angle θrest and allowable angle error θerr_th is expressed by Expression (2):

[Ex. 2]

$$\theta_{rest} \times \frac{\omega t\_max - \omega t\_lim}{\omega t\_lim} = \theta_{err\_th} \quad (2)$$

In the expression, a limit index value expressed by "(ωt_max−ωt_lim)/ωt_lim" is more reduced as turning angle limit is laxer in proximity to the neutral position and is more increased as it goes closer to the end and limit becomes stricter. When Expression (2) is organized, Expression (3) is obtained with respect to the turning angle velocity limit value ωt_lim:

[Ex. 3]

$$\omega t\_lim = \frac{\omega t\_max}{1 + \frac{\theta err\_th}{\theta rest}} \quad (3)$$

When "θrest=θerr_th," "ωt_lim=ωt_max/2" is derived from Expression (3). That is, an allowable angle error θerr_th is equivalent to a remaining angle θrest obtained when a turning angle velocity limit value ωt_lim is set to (½) of a turning angle velocity assumed maximum value ωt_max.

In this working example, an influence given to a driver by an angle error caused by turning angle velocity limit during turning can be reduced. Therefore, a vehicle behavior suppression effect during turning steering based on turning angle velocity limit and an effect of elimination of a feeling of wrongness due to angular deviation in turning angle can be both favorably achieved. A turning angle velocity limit value ωt_lim need not be calculated by Expression (3) and may be calculated by any other calculation formula, a map, or the like.

Other Embodiment (a) The steering device 10 in the above embodiment is assumed to be applied to a vehicle of a steer-by-wire system in which a driver performs driving operation and includes the reaction force device 70 and the turning device 80. This is also the same with vehicles in which manual operation and automatic operation are switchable. When the above embodiment is applied to a vehicle of a steer-by-wire system capable of fully automatic operation, the steering device may be provided only with the turning device 80 without provision of the reaction force device 70.

In this case, the turning device 80 is capable of exercising the same control as in the above embodiment by inputting a steering angle θr calculated by a control device for automatic operation of the turning device 80. Control of switching a constant of the reaction force control device 75 when turning angle velocity limit is applied as indicated by the bold arrows in FIG. 5 is unnecessary.

(b) As parameters to be used for setting a turning angle velocity limit value ωt_lim, FIG. 6 to FIG. 8 just exemplify a combination of some parameters from among a steering angle equivalent value θr or a turning angle equivalent value θt, a vehicle speed V, a vehicle behavior, and a status of turning and returning. In addition, these parameters can be combined as appropriate. In this case, the influences of individual parameters may be provided with priorities or weighting.

The present disclosure is not limited to such embodiments and can be implemented in various modes without departing from the subject matter thereof.

A control device described in the present disclosure and a technique therefor may be implemented by a dedicated computer provided by configuring a processor and a memory programmed to execute one or more functions crystallized by a computer program. Or, a control device described in the present disclosure and a technique therefor may be implemented by a dedicated computer provided by configuring a processor with one or more dedicated hardware logic circuits. Alternatively, a control device described in the present disclosure and a technique therefor may be implemented by one or more dedicated computers configured of a combination of a processor and a memory programmed to execute one or more functions and a processor configured of one or more hardware logic circuits. A computer program may be stored in a computer-readable non-transitory tangible recording medium as an instruction to be executed by a computer.

The present disclosure has been described in accordance with embodiments but the present disclosure is not limited to those embodiments or structures. The present disclosure also includes various modifications and modifications within an equivalent range. In addition, various combinations and modes and other combinations and modes obtained by adding only one element or more or less element to the combinations and modes are also included in the categories and technical scope of the present disclosure.

What is claimed is:

1. A steering device configured to turn a tire of a vehicle of a steer-by-wire system, the steering device comprising:
a turning device including
a turning actuator configured to turn the tire according to an instructed turning angle and
a turning angle control device configured to calculate a turning angle command value, which corresponds to an inputted steering angle signal, and generate a signal to drive the turning actuator based on the turning angle command value, wherein
the turning angle control device is configured to
apply a limit, such that an absolute value of a turning angle velocity becomes equal to or below a turning angle velocity limit value, which is set according to a predetermined parameter, and
vary the turning angle velocity limit value according to a turning angle equivalent value,
wherein
the turning angle control device is configured to determine the turning and the returning based on a reaction force torque and a detection value of a torque sensor.

2. The steering device according to claim 1, wherein
the steering device is to be applied to a vehicle of a steer-by-wire system in which a driver performs driving operation,
the steering device further comprising:
a reaction force device including
a reaction force actuator configured to impart reaction force to a driver's steering operation of a steering, and
a reaction force control device configured to generate a signal, which is to drive the reaction force actuator, based on a signal from the turning angle control device.

3. The steering device according to claim 1, wherein
the turning angle control device is configured to reduce the turning angle velocity limit value with reduction in a remaining angle, which is an absolute value of a difference between a current turning angle or steering angle and a critical angle at a corresponding mechanical end, according to the remaining angle, such that an angle error, which is caused by turning angle velocity limit, becomes equal to a predetermined allowable angle error or below.

4. The steering device according to claim 1, wherein
the turning angle control device is configured to vary the turning angle velocity limit value according to a vehicle behavior.

5. The steering device according to claim 1, wherein
the turning angle control device is configured to vary the turning angle velocity limit value according to a vehicle speed.

6. The steering device according to claim 1, wherein
the turning angle control device is configured to vary a steering angle ratio, which is a ratio of a turning angle to a steering angle, according to a steering angle equivalent value or a turning angle equivalent value.

7. The steering device according to claim 1, wherein
the turning angle control device is configured to vary the turning angle velocity limit value in both the turning and the returning.

8. The steering device according to claim 1, wherein
the turning angle control device is configured to determine the turning and the returning based on the steering angle signal and the turning angle velocity.

9. The steering device according to claim 1, wherein
the turning angle control device is configured to determine the turning and the returning based on a steering torque and the turning angle velocity.

10. A steering device configured to turn a tire of a vehicle of a steer-by-wire system, the steering device comprising:
a turning device including
a turning actuator configured to turn the tire according to an instructed turning angle and
a turning angle control device configured to calculate a turning angle command value, which corresponds to an inputted steering angle signal, and generate a signal to drive the turning actuator based on the turning angle command value, wherein
the turning angle control device is configured to
apply a limit, such that an absolute value of a turning angle velocity becomes equal to or below a turning angle velocity limit value, which is set according to a predetermined parameter, and
vary the turning angle velocity limit value according to a status of turning and returning, wherein
the turning angle velocity limit value for returning is smaller than the turning angle velocity limit value for turning.

11. A steering device configured to turn a tire of a vehicle of a steer-by-wire system, the steering device comprising:
a turning device including
a turning actuator configured to turn the tire according to an instructed turning angle and
a turning angle control device configured to calculate a turning angle command value, which corresponds to an inputted steering angle signal, and generate a signal to drive the turning actuator based on the turning angle command value, wherein
the turning angle control device is configured to
apply a limit, such that an absolute value of a turning angle velocity becomes equal to or below a turning angle velocity limit value, which is set according to a predetermined parameter, and
vary the turning angle velocity limit value according to a turning angle equivalent value, wherein
the steering device is to be applied to a vehicle of a steer-by-wire system in which a driver performs driving operation,
the steering device further comprising:
a reaction force device including
a reaction force actuator configured to impart reaction force to a driver's steering operation of a steering, and
a reaction force control device configured to generate a signal, which is to drive the reaction force actuator, based on a signal from the turning angle control device,
wherein
the reaction force device is configured to i) switch a constant of the reaction force control device or ii) to match a constant of friction control and a constant of inertia control, such that the reaction force is increased, when the turning angle control device applies the limit to the turning angle velocity.

* * * * *